J. E. JONES.
COUPLING CLAMP FOR PIPE LINE SHAFTING.
APPLICATION FILED APR. 6, 1908.
935,111.
Patented Sept. 28, 1909.
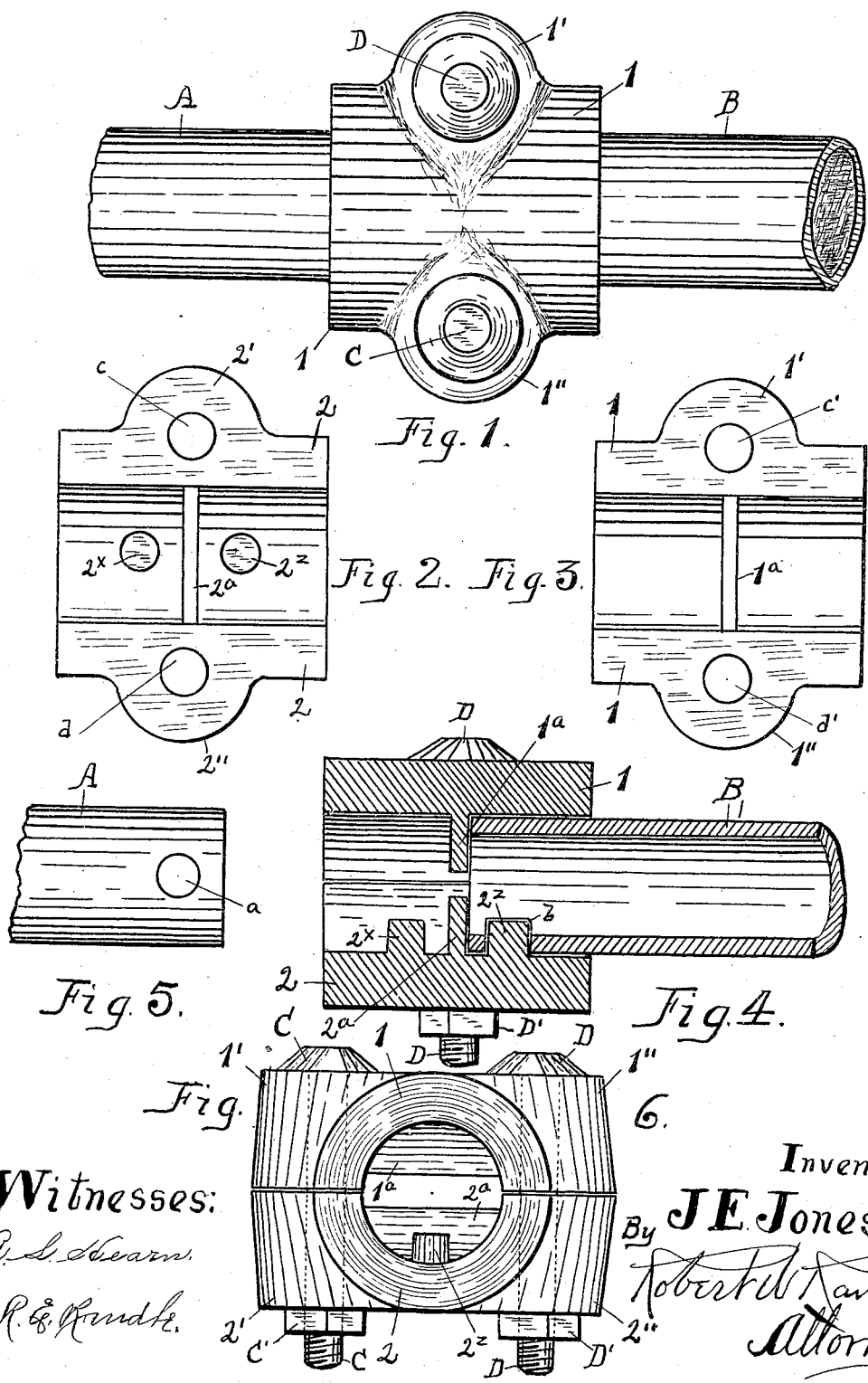

UNITED STATES PATENT OFFICE.

JAMES E. JONES, OF RICHMOND, INDIANA.

COUPLING-CLAMP FOR PIPE-LINE SHAFTING.

935,111.  Specification of Letters Patent.  Patented Sept. 28, 1909.

Application filed April 6, 1908. Serial No. 425,336.

*To all whom it may concern:*

Be it known that I, JAMES E. JONES, a citizen of the United States, residing in the city of Richmond, in the county of Wayne and State of Indiana, have invented new and useful Improvements in Coupling-Clamps for Pipe-Line Shafting, of which the following is a full, clear, and comprehensive specification and exposition, being such as will enable others skilled in the art to which the invention relates to make and use the same with exactitude.

The object of my present invention, broadly speaking, is to provide a coupling for pipe line-shafting, which will be strong and durable in construction, easily manipulated and controlled, positive in action, and which can be manufactured and sold at a comparatively low price.

More particularly stated, my object is to provide a coupling for pipe line shaftings, by the employment of which it will not be necessary to thread the ends of the shafting sections, at the same time providing means for coupling the sections which will be more positive in action, and will be more easily operated in coupling and uncoupling the sections of shafting, and which will save time, and consequently expense, in placing the shafting in position, or in replacing sections thereof.

Other objects and particular advantages of my invention will present themselves in the course of the ensuing specification.

One manner for carrying out the objects of my invention in a practical manner, and that which in practice has been found to be the most desirable, is shown most clearly in the accompanying drawings, in which—

Figure 1 shows a plan view of my invention complete and in operative position. Fig. 2 shows an inside view of one of the clamping members. Fig. 3 is an inside view of the other clamping member. Fig. 4 is a central longitudinal sectional view, taken through the two clamping members. Fig. 5 is a detail view showing one end-portion of a pipe section, and Fig. 6 is an end elevation of the two clamping members associated in operative position, but without the members to be clamped.

Similar indices denote like parts throughout the several views.

In the drawings the letters A and B denote portions of two sections of pipe or tubing, without threads or the like around their end portions. A small aperture is formed through one side of each pipe section near its inner end, which apertures are indicated by the letters $a$ and $b$, respectively, as shown in Figs. 5 and 4. Said pipe sections and their apertures are identical with each other, and are therefore interchangeable.

The clamp proper comprises two main members 1 and 2, each being substantially half-round and are complements of each other, their parallel faces being adapted to be contacted with each other, or nearly so as shown in Figs. 4 and 6.

Formed integral with the member 1 are the oppositely disposed ears 1' and 1'', and integral with the member 2 are the oppositely disposed ears 2' and 2'', each pair of ears being adapted to contact with like ears of the opposite member, their contact faces being flush with the faces of the body portion of their respective members, as indicated in Fig. 6. Bolt apertures $c$—$d$ are formed in the ears 2'—2'' respectively, and bolt apertures $c'$—$d'$ are formed in the ears 1'—1'' respectively, the bolt apertures in one pair of ears being formed in alinement with the bolt apertures of the opposite pair of ears, to receive the respective bolts C and D, having the respective nuts C' and D'.

The interior diameter of the combined members 1 and 2 is such as to nearly surround the ends of the pipe sections A and B and conforming in contour thereto in cross section as indicated, thereby forming a pipe aperture as indicated. Said central aperture of the combined members A and B is divided in its center, and extending thereacross, are two abutments, $1^a$ and $2^a$, each being formed integral with its respective member 1 and 2. Said abutments are oppositely disposed with reference to each other but are spaced apart as indicated in Figs. 4 and 6.

Extending centerward from the interior of the member 2, and central of the abutment $2^a$ and located on each side thereof and a short distance therefrom, are the two lugs $2^x$ and $2^z$ which are round in cross section, and are slightly less in diameter than are the apertures $a$ and $b$, respectively, in which they are adapted to fit, as indicated in Fig. 4.

The utilization of my invention is the acme of simplicity: The sections of tubing forming the shaft are simply squared at their ends, and an aperture $a$, or $b$, is formed through one side at a predetermined distance from the ends, which completes the preparation of the shafting. Desiring now to couple two sections together I take the member 2 and lay the end of section A therein, allowing the lug $2^x$ to enter the aperture $a$, and in like manner section B is brought to position, allowing the lug $2^z$ to enter the aperture $b$, as in Fig. 4. I now place the member 1 in position, as in Fig. 6, and then insert the bolts C and D in their respective apertures, $d'$—$d$, and $c'$—$c$, next run the nuts $C'$ and $D'$ on their respective bolts, as in Fig. 6, and when said nuts are tightened the members 1 and 2 will be clamped around the approaching ends of the sections A and B, the ends of the sections being abutted against opposite sides of the abutments $1^a$—$2^a$ and held thereagainst by reason of the lugs $2^x$ and $2^z$, thereby rigidly locking the ends of the sections in alinement as in Fig. 1. By this arrangement it is apparent that when one of the sections is turned revolubly it will of necessity turn the other section therewith positively, there being no chance of slipping of one section independent of the other. It is also manifest that great economy is attained in uncoupling the sections, and also that one section of a line of shafting may be uncoupled, taken out, and replaced without disturbing the other sections, which would be impossible if the sections were united with threaded couplings.

I reserve the privilege of making various changes in the details of construction in order to meet varying conditions, as for instance, the lugs $2^x$ and $2^z$ may be specially prepared of extra hardened metal and then inserted in position either during or after the formation of the clamp members; or, if desired, the member 1 may also be provided with lugs, like unto the lugs $2^x$ and $2^z$, which of course would necessitate two oppositely disposed apertures being formed in each end of each pipe section; and also the sections A and B may be solid metal shafting, in place of tubing as shown, all of which may be done without sacrificing any of the advantages of my invention.

The structure of the invention disclosed herein is especially designed to provide the maximum strength in proportion to the weight of metal employed. The transverse ribs, which serve as abutments for the shaft or pipe ends, are straight and rigid, and hence constitute efficient bracing means to resist fracture of the coupling members.

Having now fully shown and described my invention and the best manner for its construction and operation to me known at this time, what I claim and desire to secure by Letters Patent of the United States, is—

In a device of the character described, the combination of pipe sections, each having a lateral hole near its end, complemental clamp members, each having a central transverse flat rigid abutment constituting an internal brace, and one clamp member having rigid studs on opposite sides of its abutment to enter the holes aforesaid, and means to secure the clamp sections together and thereby lock the pipe sections securely against the said abutments.

In testimony whereof I have hereunto subscribed my name in the presence of two subscribing witnesses.

JAMES E. JONES.

Witnesses:
 HENRY R. PACKER,
 R. W. RANDLE.